United States Patent
Rowlands et al.

(10) Patent No.: US 7,549,091 B2
(45) Date of Patent: Jun. 16, 2009

(54) HYPERTRANSPORT EXCEPTION DETECTION AND PROCESSING

(75) Inventors: Joseph B. Rowlands, Santa Clara, CA (US); Laurent Moll, Saratoga, CA (US)

(73) Assignee: Broadcom Corporation, Irvine, CA (US)

( * ) Notice: Subject to any disclaimer, the term of this patent is extended or adjusted under 35 U.S.C. 154(b) by 495 days.

(21) Appl. No.: 10/684,953

(22) Filed: Oct. 14, 2003

(65) Prior Publication Data
US 2005/0081127 A1 Apr. 14, 2005

(51) Int. Cl.
G06F 11/00 (2006.01)
(52) U.S. Cl. .............................. 714/45; 714/26; 714/43; 714/44
(58) Field of Classification Search .................... 714/26, 714/43, 44, 45; 710/15, 26, 305
See application file for complete search history.

(56) References Cited

U.S. PATENT DOCUMENTS

| | | | |
|---|---|---|---|
| 5,428,766 A * | 6/1995 | Seaman | 714/43 |
| 6,915,446 B2 * | 7/2005 | Riley | 714/5 |
| 7,069,479 B2 * | 6/2006 | Hester et al. | 714/45 |
| 7,103,808 B2 * | 9/2006 | Kitamorn et al. | 714/44 |
| 2005/0080580 A1 * | 4/2005 | Kantake | 702/117 |

\* cited by examiner

Primary Examiner—Robert Beausoliel
Assistant Examiner—Joseph D Manoskey
(74) Attorney, Agent, or Firm—Garlick Harrison & Markison

(57) ABSTRACT

In accordance with the present invention a system for detecting transaction errors in a system comprising a plurality of data processing devices using a common system interconnect bus, comprises a node controller operably connected to said system interconnect bus and a plurality of interface agents communicatively coupled to said node controller. Error corresponding to transactions between said interface agents and other processing modules in said system are directed to said node controller; and wherein transaction errors that would not normally be communicated to said system interconnect bus are communicated by said node controller to said system interconnect bus to be available for detection. In an embodiment of the present invention, the interface agents operate in accordance with the hypertransport protocol. A system control and debug unit and a trace cache operably connected to the system bus can be used to diagnose and store errors conditions.

17 Claims, 2 Drawing Sheets

HYPERTRANSPORT EXCEPTION DETECTION AND PROCESSING

RELATED APPLICATIONS

This application is related to U.S. Provisional Patent Application Ser. No. 60/380,740, filed May 15, 2002; U.S. Provisional Patent Application Ser. No. 60/331,789, filed Nov. 20, 2001; U.S. Provisional Patent Application Ser. No. 60/344,713, filed Dec. 24, 2001; U.S. Provisional Patent Application Ser. No. 60/348,777, filed Jan. 14, 2002, U.S. Provisional Patent Application Ser. No. 60/348,717, filed Jan. 14, 2002, U.S. patent application Ser. No. 10/270,016, filed Oct. 11, 2002 and U.S. patent application Ser. No. 10/269,666, filed Oct. 11, 2002, each of which is incorporated herein by reference in its entirety.

BACKGROUND OF THE INVENTION

1. Field of the Invention

The present invention is directed in general to data communications. More specifically, the present invention provides an improved method and apparatus for detection of errors relating to transactions in high speed data processing systems.

2. Related Art

As is known, communication technologies that link electronic devices are many and varied, servicing communications via both physical media and wirelessly. Some communication technologies interface a pair of devices, other communication technologies interface small groups of devices, and still other communication technologies interface large groups of devices.

Examples of communication technologies that couple small groups of devices include buses within digital computers, e.g., PCI (peripheral component interface) bus, ISA (industry standard architecture) bus, USB (universal serial bus), and SPI (system packet interface). One relatively new communication technology for coupling relatively small groups of devices is the HyperTransport (HT) technology, previously known as the Lightning Data Transport technology (HyperTransport I/O Link Specification "HT Standard"). The HT Standard sets forth definitions for a high-speed, low-latency protocol that can interface with today's buses like AGP, PCI, SPI, 1394, USB 2.0, and 1 Gbit Ethernet as well as next generation buses including AGP 8x, Infiniband, PCI-X, PCI 3.0, and 10Gbit Ethernet. HT interconnects provide high-speed data links between coupled devices. Most HT enabled devices include at least a pair of HT ports so that HT enabled devices may be daisy-chained. In an HT chain or fabric, each coupled device may communicate with each other coupled device using appropriate addressing and control. Examples of devices that may be HT chained include packet data routers, server computers, data storage devices, and other computer peripheral devices, among others.

In many data processing systems, data transaction errors are difficult to detect and diagnose. Therefore, many system components in such data processing systems simply mark an internal register that may not be seen by the CPU and, therefore, no diagnosis and documentation is obtained regarding the nature of the error. There is a need, therefore, for an efficient and effective method an apparatus for detecting and diagnosing errors in high-speed data processing systems, such as the data processing system implementing HyperTransport techniques as described herein.

SUMMARY OF THE INVENTION

In accordance with the present invention a system for detecting transaction errors in a system comprising a plurality of data processing devices using a common system interconnect bus, comprises a node controller operably connected to said system interconnect bus and a plurality of interface agents communicatively coupled to said node controller. Error corresponding to transactions between said interface agents and other processing modules in said system are directed to said node controller; and wherein transaction errors that would not normally be communicated to said system interconnect bus are communicated by said node controller to said system interconnect bus to be available for detection. In an embodiment of the present invention, the interface agents operate in accordance with the hypertransport protocol. A system control and debug unit and a trace cache operably connected to the system bus can be used to diagnose and store errors conditions.

DETAILED DESCRIPTION

Figure 1:
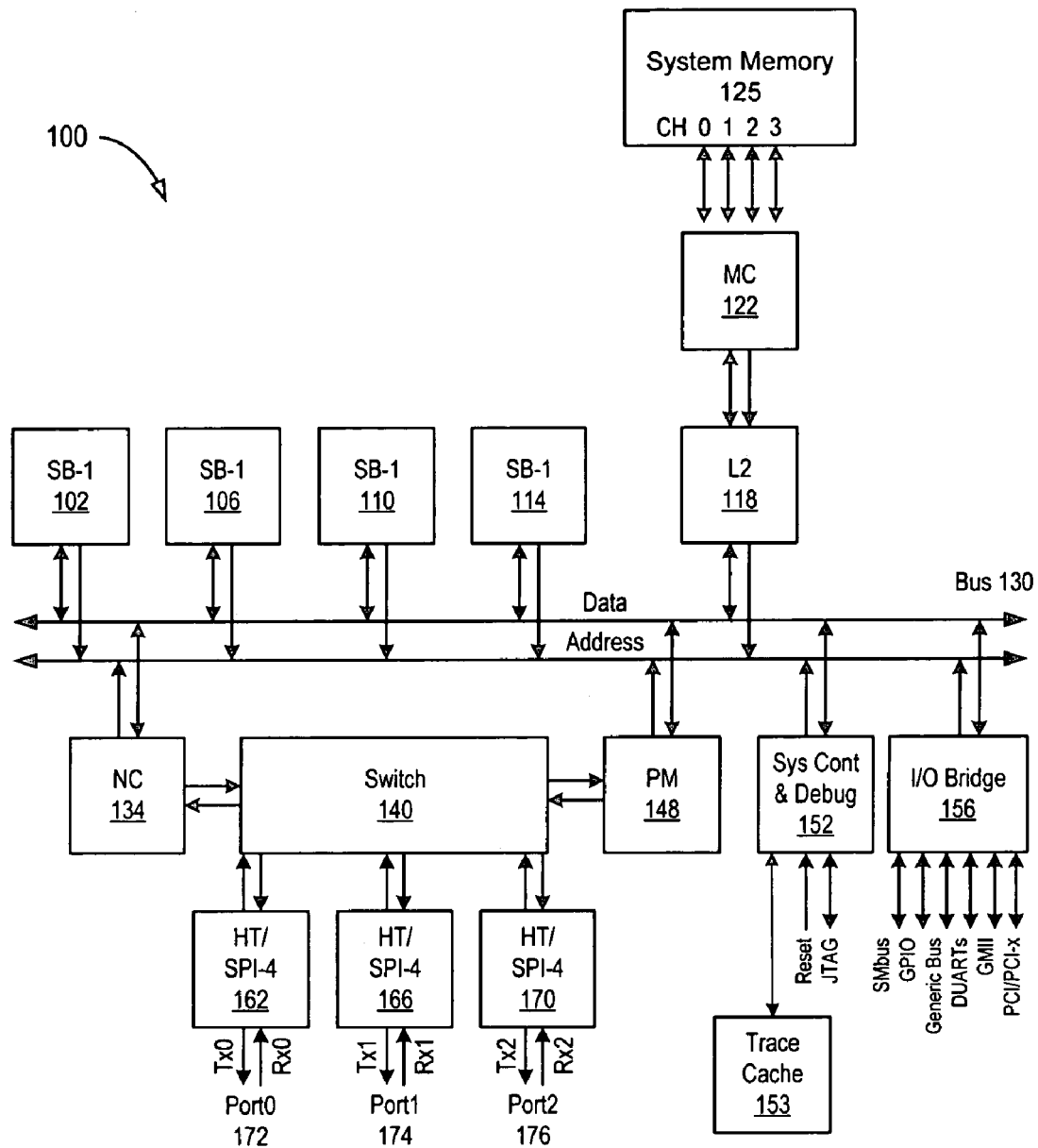
FIG. 1 shows a block diagram of a network multiprocessor switching system-on-a-chip.

A system level description of the operation of an embodiment of the multiprocessor switching system of the present invention is shown in FIG. 1 which depicts a schematic block diagram of a multiprocessor device 100 in accordance with the present invention. The multiprocessor device 100 may be an integrated circuit or it may be constructed from discrete components. The multiprocessor device 100 includes a plurality of processing units 102, 106, 110, 114, cache memory 118, memory controller 122, which interfaces with on and/or off-chip system memory 125, an internal bus 130, a node controller 134, a switching module 140, a packet manager 148, a system controller 152, an I/O Bridge 156 which interfaces the system bus various system interfaces, and a plurality of configurable packet based interfaces 162, 166, 170, such as three flexible HyperTransport/SPI-4 Phase 2 links.

As shown in FIG. 1, the four processors 102, 106, 110, 114 are joined to the internal bus 130. When implemented as standard MIPS64 cores, the processors 102, 106, 110, 114 have floating-point support, and are independent, allowing applications to be migrated from one processor to another if necessary. The processors 102, 106, 110, 114 may be designed to any instruction set architecture, and may execute programs written to that instruction set architecture. Exemplary instruction set architectures may include the MIPS instruction set architecture (including the MIPS-3D and MIPS MDMX application specific extensions), the IA-32 or IA-64 instruction set architectures developed by Intel Corp., the PowerPC instruction set architecture, the Alpha instruction set architecture, the ARM instruction set architecture, or any other instruction set architecture. The system 100 may include any number of processors (e.g., as few as one processor, two processors, four processors, etc.). In addition, each processing unit 102, 106, 110, 114 may include a memory sub-system (level 1 cache) of an instruction cache and a data cache and may support separately, or in combination, one or more processing functions.

The internal bus 130 may be any form of communication medium between the devices coupled to the bus. For example, the bus 130 may include shared buses, crossbar connections, point-to-point connections in a ring, star, or any other topology, meshes, cubes, etc. In selected embodiments, the internal bus 130 may be a split transaction bus (i.e., having separate address and data phases). The data phases of various transactions on the bus may proceed out of order with the address phases. The bus may also support coherency and thus may include a response phase to transmit coherency response information. The bus may employ a distributed arbitration scheme, and may be pipelined. The bus may employ any suitable signaling technique. For example, differential signaling may be used for high speed signal transmission. Other embodiments may employ any other signaling technique (e.g., TTL, CMOS, GTL, HSTL, etc.). Other embodiments may employ non-split transaction buses arbitrated with a single arbitration for address and data and/or a split transaction bus in which the data bus is not explicitly arbitrated. Either a central arbitration scheme or a distributed arbitration scheme may be used, according to design choice. Furthermore, the bus may not be pipelined, if desired. In addition, the internal bus 130 may be a high-speed (e.g., 128-Gbit/s) 256 bit cache line wide split transaction cache coherent multiprocessor bus that couples the processing units 102, 106, 110, 114, cache memory 118, memory controller 122 (illustrated for architecture purposes as being connected through cache memory 118), node controller 134 and packet manager 148 together. The bus 130 may run in big-endian and little-endian modes, and may implement the standard MESI protocol to ensure coherency between the four CPUs, their level 1 caches, and the shared level 2 cache 118. In addition, the bus 130 may be implemented to support all on-chip peripherals, including the input/output bridge interface 156 for the generic bus, SMbus, UARTs, GPIO, Ethernet MAC and PCI/PCI-X interface. The cache memory 118 may function as an L2 cache for the processing units 102, 106, 110, 114, node controller 134 and/or packet manager 148.

The memory controller 122 provides an interface to system memory, which, when the multiprocessor device 100 is an integrated circuit, may be off-chip and/or on-chip. The memory controller 122 is configured to access the system memory in response to read and write commands received on the bus 130. The L2 cache 118 may be coupled to the bus 130 for caching various blocks from the system memory for more rapid access by agents coupled to the bus 130. In such embodiments, the memory controller 122 may receive a hit signal from the L2 cache 118, and if a hit is detected in the L2 cache for a given read/write command, the memory controller 122 may not respond to that command. Generally, a read command causes a transfer of data from the system memory (although some read commands may be serviced from a cache such as an L2 cache or a cache in the processors 102, 106, 110, 114) and a write command causes a transfer of data to the system memory (although some write commands may be serviced in a cache, similar to reads). The memory controller 122 may be designed to access any of a variety of types of memory. For example, the memory controller 122 may be designed for synchronous dynamic random access memory (SDRAM), and more particularly double data rate (DDR) SDRAM. Alternatively, the memory controller 122 may be designed for DRAM, DDR synchronous graphics RAM (SGRAM), DDR fast cycle RAM (FCRAM), DDR-II SDRAM, Rambus DRAM (RDRAM), SRAM, or any other suitable memory device or combinations of the above mentioned memory devices.

The node controller 134 functions as a bridge between the internal bus 130 and the configurable packet-based interfaces 162, 166, 170. Accordingly, accesses originated on either side of the node controller will be translated and sent on to the other. The node controller also supports the distributed shared memory model associated with the cache coherency non-uniform memory access (CC-NUMA) protocol.

The packet manager 148 circuitry communicates packets between the interfaces 162, 166, 170 and the system memory, and may be a direct memory access (DMA) engine that writes packets received from the switching module 140 into input queues of the system memory and reads packets from output queues of the system memory to the appropriate configurable packet-based interface 162, 166, 170. The packet manager 148 may include a packet manager input and a packet manager output, each having its own DMA engine and associated cache memory. The cache memory may be arranged as first-in-first-out (FIFO) buffers that respectively support the input queues and output queues.

The packet manager circuit 148 comprises circuitry shared by the interfaces 162, 166, 170. The packet manager may generate write commands to the memory controller 122 to write received packets to the system memory, and may generate read commands to read packets from the system memory for transmission by one of the interfaces 162, 166, 170. In some embodiments, the packet manager 148 may be a more efficient use of hardware than having individual DMA engines for each of the interfaces 162, 166, 170. Additionally, the packet manager may simplify communication on the bus 130, in some embodiments, for packet data transfers. It is noted that, in some embodiments, the system 100 may include an L2 cache coupled to the bus 130. The packet manager 148 may be configured, in some embodiments, to cause a portion of the packet data to be stored into the L2 cache in addition to being stored in memory. In some embodiments, the packet manager 148 may use descriptors to locate the memory locations for reading and writing packet data. The descriptors may be stored in the L2 cache or in main memory. The packet manager 148 may read and write the descriptors as well.

In some embodiments, the interfaces 162, 166, 170 may have dedicated communication paths to the node controller 134 or packet manager 148. However, in the illustrated embodiment, the system 100 employs a switch 140. The switch 140 may selectively couple one of the receive/transmit interfaces 162, 166, 170 to the node controller 134 or packet manager 148 to transfer received data. The switch 140 may selectively couple the packet manager 148 to one of the interfaces 162, 166, 170 to transfer packet data from the packet manager 148 to the interfaces 162, 166, 170 for transmission on the corresponding ports 172, 174, 176. The switch 140 may have request/grant interfaces to each of the interfaces 162, 166, 170 and the packet manager 148 for requesting transfers and granting those transfers. As will be appreciated, a receive/transmit interface includes any circuitry configured to communicate on a port according to the protocol defined for the port. The interface may include receive circuitry configured to receive communications on the port and to transmit the received communications to other circuitry internal to the system that includes the interface. The interface may also include transmit circuitry configured to receive communications from the other circuitry internal to the system and configured to transmit the communications on the port. The switching module 140 functions to direct data traffic, which may be in a generic format, between the node controller 134 and the configurable packet-based interfaces 162, 166, 170 and between the packet manager 148 and the configurable packet-based interfaces. The generic format may include 8 byte data words or 16 byte data words formatted in accordance with a proprietary protocol, in accordance with asynchronous transfer mode (ATM) cells, in accordance with internet protocol (IP) packets, in accordance with transmission control protocol/internet protocol (TCP/IP) packets, and/or in general, in accordance with any packet-switched protocol or circuit-switched protocol. In a selected embodiment, a 256-Gbit/s switch 140 connects the on-chip memory 118 and processors 102, 106, 110, 114 to the three Hyper-Transport/SPI-4 links 162, 166, 170, and provides transparent forwarding of network, ccNUMA access, and HyperTransport packets when necessary.

The configurable packet-based interfaces 162, 166, 170 generally function to convert data from a high-speed communication protocol (e.g., HT, SPI, etc.) utilized between multiprocessor devices 100 and the generic format of data within the multiprocessor devices 100. Accordingly, the configurable packet-based interface 162, 166, 170 may convert received HT or SPI packets into the generic format packets or data words for processing within the multiprocessor device 100, such as by using a receiver interface (which amplifies and time aligns the data received via the physical link and then converts the received protocol-formatted data into data from a plurality of virtual channels having the generic format), hash and route block and receiver buffer for holding the data until a routing decision is made. Packets arriving through receiver interface(s) of the chip can be decoded in either SPI-4 mode (native packet mode) or in HyperTransport (HT) mode, in which case, it uses a special extension called Packet-over-HT (POHT) to transfer the packets. From a logical perspective, both modes provide almost identical services. In addition, the configurable packet-based interfaces 162, 166, 170 may convert outbound (transmit) data of a plurality of virtual channels in the generic format received from the switching module 140 into HT packets or SPI packets, such as by using a transmitter formatter and transmitter interface, which take the incoming packet data chunks from the switch and format them according to the mode it is configured in, and then drive the high-speed formatted stream of data onto the physical link coupling the present multiprocessor device 100 to another multiprocessor device. The particular conversion of packets to generic formatted data performed by the configurable packet-based interfaces 162, 166, 170 is based on configuration information, which, for example, indicates configuration for HT to generic format conversion or SPI to generic format conversion.

The system controller 152 is coupled to provide interrupts to the interrupt lines in processors 102, 106, 110, 114 and is further coupled to receive interrupt requests from system modules (such as packet manager 152 or packet-based interfaces 162, 166, 170 illustrated in FIG. 1) and from other devices within the system 100 (not shown). In an alternative embodiment described herein, the interrupt mapping function may instead or in addition be provided in the various system modules that generate interrupts, such as the packet manager 152 or packet-based interfaces 162, 166, 170 illustrated in FIG. 1. The system controller 152 may map each interrupt to one of the interrupt lines of processors 102, 106, 110, 114, and may assert an interrupt signal to the selected processor 102, 106, 110, 114. The processors 102, 106, 110, 114 may access the system controller 152 to determine the source of a given interrupt. The system controller 152 may employ any mapping mechanism. In one embodiment, the system controller 152 may comprise a channel register and a source register to map each interrupt request to each processor 102, 106, 110, 114. The channel register identifies to the processor which channels are generating interrupts, and the source register indicates the real source of a channel's interrupt. By using a programmable interrupt controller in the packet manager with interrupt channel and source information stored in configuration status registers, the interrupt mapper can mask events and vector interrupts to their final destination using at most two CSR read operations by the processor, although additional mapping can be done in the system controller 152.

In one embodiment, the interfaces 162, 166, 170 may support a set of virtual channels (VCs) in which packets are transmitted. A virtual channel corresponds to the notion of "port" in the SPI-4 specification, and may be used to provide virtual independent flow of packets. The VC is "virtual" in that all the datapaths, including at the I/Os, are provided through a single physical channel, for example by time-multiplexing multiple flows through a single physical channel. Each virtual channel is defined to flow independently of the other virtual channels, even though the virtual channels may share certain physical resources (e.g., the port 172, 174, 176 on which the packets are flowing). These virtual channels may be mapped to internal virtual channels (also referred to as output virtual channels). The datapaths of the high-speed ports 162, 166, 170, the switch 140, and the packet manager 148 all support virtual channels. That is, the switch may grant a coupling between a source and a destination based not only on the ability of the source to transfer data and the destination to receive data, but also on the ability of the source to transfer data in a particular output virtual channel and the destination to receive data on that output virtual channel. Thus, requests from sources may indicate the destination and the virtual channel on which data is to be transferred, and requests from destinations may indicate the virtual channel on which data may be received. Additionally, in some embodiments, the switch 140 may merge inputs to a given destination virtual channel on a packet boundary. That is, if two sources are requesting to transfer packet data to the same destination and virtual channel, and one of the sources has been granted to that destination and virtual channel, the switch inhibits granting to the other source for that destination and virtual channel until the current source reaches a packet boundary.

In one embodiment, the system 100 (and more particularly the processors 102, 106, etc., the memory controller 122, the interfaces 162, 166, etc., the node controller 134, the packet manager 148, the switch 140, the system controller 152 and the bus 130) may be integrated onto a single integrated circuit as a system on a chip configuration. Additional circuitry (such as PCI interfaces, serial interfaces, Personal Computer Memory Card International Association (PCMCIA) interfaces, etc.) may also be integrated. Alternatively, other embodiments may implement one or more of the devices as separate integrated circuits. In another configuration, the system memory may be integrated as well. Alternatively, one or more of the components may be implemented as separate integrated circuits, or all components may be separate integrated circuits, as desired. Any level of integration may be used. The system 100 may be designed to take advantage of the integration by tightly coupling the components to provide high performance packet processing. Specifically, the processors 102, 106, etc., the L2 cache 118, the memory controller 122, node controller 134, system bus 130 and the packet interface circuits 162, 166, 170 may be tightly coupled to receive, process, and forward data (if necessary).

As will be understood, the multiprocessor device 100 of the present invention provides multiprocessing functionality on its own which makes it suitable for scientific and embedded applications requiring significant computational capabilities. In a selected embodiment, the multiprocessor device 100 of the present invention contains a number of peripherals along with its sophisticated memory and communication support. For example, in a selected embodiment, the processor cores (e.g., 102) are 0.8 to 1.2-GHz, 64-bit MIPS with 64 kbytes of level one cache memory per processor and 1 Mbyte of level two cache 118 per chip; an 800-MHz DDR controller 122; off-chip ccNUMA support and optional ECC support. Three 8/16-bit receive/transmit ports 162, 166, 170 are also provided that are configurable as either HyperTransport or SPI-4 links. Additional peripheral features include an input/output bridge 156 that includes a 10/100/1000 Ethernet MAC interface, general-purpose I/O ports, SMBus serial interfaces, four DUARTs and a 32-bit 33/66-MHz PCI or 64-bit 133 MHz PCI/x interface.

In addition to providing stand alone computational functions, the multiprocessor devices 100 may also be used in communication-oriented applications that need significant computational support, like an array of HyperTransport linked chips for use with Internet service routers and switches with deep content switching and differentiated services such as quality-of-service (QoS) and virtual private networks (VPNs). The multiprocessor devices 100 may also be used in Internet-Protocol (IP) servers and subscriber-management platforms, servers supporting high computational requirements for scientific or Enterprise Java environments, and wireless infrastructure equipment. With three ports 172, 174, 176 on the chip, up to eight chips can be connected via the HyperTransport links in a "cube" configuration of nodes, for a 32-processor system.

When used in a HyperTransport linked network, the multiprocessor devices 100 provide a highly integrated nonuniform memory access (NUMA) architecture with low power consumption that multiplexes memory and I/O traffic on the same link. In contrast to conventional symmetrical multiprocessing systems (where all processors have the same memory access time and a bus or switch acts as an interface between processors and the memory subsystem so that cache coherence is maintained by monitoring the bus or the switch traffic), with NUMA, the memory address space is made up of the combined local memory (e.g., system memory 125) from each node in the system. A processor can access its local memory faster than nonlocal memory. NUMA systems have the advantage of being easily expanded, while adding a processor to a conventional SMP shared memory architecture is more difficult because an additional port is needed.

By using a cache-coherent form of NUMA (ccNUMA), on-chip caches can remain up to date even while data moves through the processor/memory interconnect. The on-chip double-data-rate (DDR) memory controller 122 supports the chip's local, off-chip memory, and its HyperTransport links 162, 166, 170 provide ccNUMA support.

Figure 2:
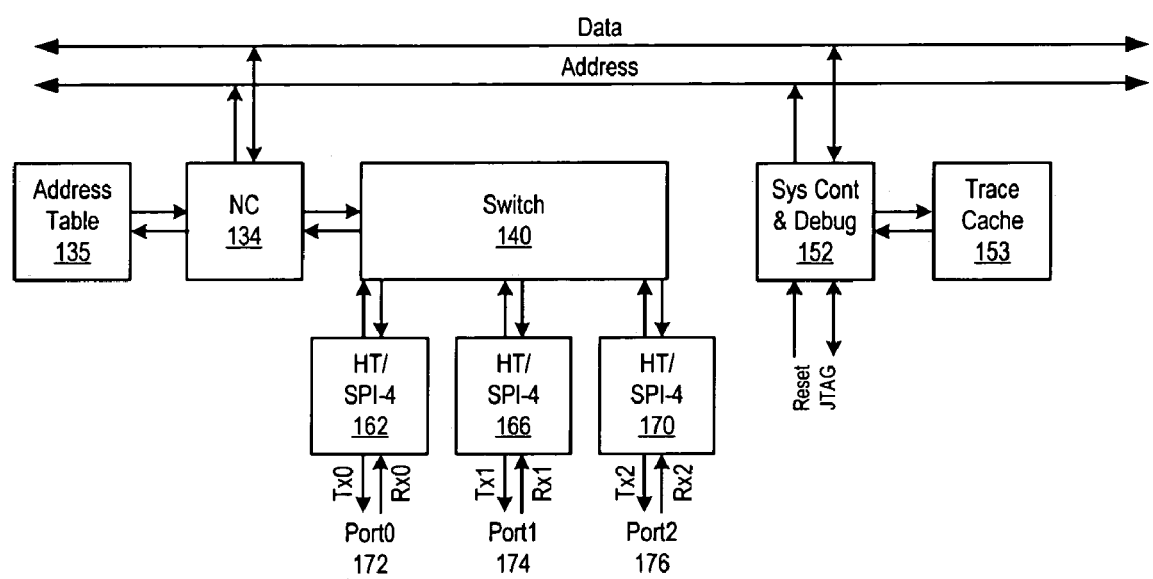
FIG. 2 is a block diagram of system components for implementing the error detection method and apparatus of the present invention.

The method and apparatus of the present invention with regard to detection of errors related to HT transactions can be understood by referring to FIG. 2, which illustrates a subset of components discussed above in connection with FIG. 1. As will be understood by those of skill in the art, transaction errors can occur in the system at numerous locations, such as the switch 140 or the node controller 134. Errors of particular interest in the system of the present invention, however, are those associated with HT transactions communicated through the HT ports 162, 166, and 170.

In many data processing systems, data transaction errors are difficult to detect and diagnose. Therefore, many system components in such data processing systems simply mark an internal register that may not be seen by the CPU and, therefore, no diagnosis and documentation is obtained regarding the nature of the error. In the system of the present invention, however, errors in the various system components are detected by the node controller 134 and are transferred to the system interconnect bus 130 to make these errors visible to diagnostic modules, such as the system control and debug module 152 connected to the bus 130. In addition, transferring the errors to the bus 130 has the advantage of making the errors visible in the order they came in, thus making it possible to infer when the error occurred and to determine the context of the error.

In the system of the present invention, the node controller 134 is operable to detect transaction errors and to "flag" these errors by sending the transactions to an address that is known to correspond to an error condition. An address table 135, shown in FIG. 2 contains a range of register addresses that are used by the node controller 134 and other system components for routing transactions. In the present invention, a predetermined range of the registers in the address table 135 are designated to correspond to specific error conditions. These addresses do not correspond to actual physical registers but, instead, refer to virtual registers. Therefore, these registers are sometimes referred to as "dummy registers." These dummy registers can be written without adverse side-effects on the system. Instead, transactions corresponding to these dummy addresses will be understood to correspond to transaction errors because they are associated with a dummy error register address. For non-posted writes, which require a response, the error status in the response is set to correspond to the type of transaction error indicated by the dummy register address. The dummy registers can also be read. In this case, the Node Controller will generate a response that contains appropriate data and error status for the type of transaction error indicated by the dummy register address. Individual interface agents 162 166 170 can also send incoming transactions to the dummy error registers if they detect an error. The dummy error register address chosen for a particular error type is enough for the dummy error register logic to know how to handle appropriately the transactions sent to it. This way, the first agent that determines that there is an error with a transaction only has to send that transaction to the corresponding dummy error register. Other agents on the path of the transaction don't need to redetermine that there is an error.

One of the advantages of the system of the present invention is that the individual agents are not required to generate their own bad responses for reads (or non-posted writes) that are determined to contain an error. Instead, the node controller 134 generates the responses and thereby simplifies the hardware needed in the system components of the present invention.

The specific addresses for each of the "dummy registers" correspond to specific error conditions detected by the node controller. Examples of some specific error conditions are illustrated in Table 1.

TABLE 1

```
* nc_addressmapi
*****************************************************/
`define NCAMAP_NO_ERROR_ADDR        40'h00FFBD0000
`define NCAMAP_DIR_NXA_ADDR         40'h00FFBD1000
`define NCAMAP_INT_ERROR_ADDR       40'h00FFBD2000
`define NCAMAP_INT_NXA_ADDR         40'h00FFBD3000
`define NCAMAP_FENCE_ADDR           40'h00FFBD4000
`define NCAMAP_FLUSH_ADDR           40'h00FFBD5000
`define NCAMAP_BRCST_ADDR           40'h00FFBD6000
`define NCAMAP_ATOMIC_ADDR          40'h00FFBD7000
`define NCAMAP_NONCCNUMA_ADDR       40'h00FFBD8000
/******************************************************
* rx_addressmap
*****************************************************/
`define RXAMAP_DIR_NXA_ADDR         40'hFE00010000
`define RXAMAP_INT_ERR_ADDR         40'hFE00020000
`define RXAMAP_INT_NXA_ADDR         40'hFE00030000
```

By directing the transaction errors to dummy addresses and transferring these errors onto the system bus 130, various system components will have access to the error conditions for diagnostic purposes. In particular, these errors will be detected by the system control and debug module 152 that has responsibility for performing debug and monitoring functions. A programmable trace cache 153 can be used to store and trace error conditions carried on the bus 130. The trace cache 153 comprises an address trap mechanism that can be used to detect and store information relating to a specific type of error condition. Thus it is possible to program the trace cache 153 to look for particular types of error conditions, run the system until it crashes, and then download the data from the trace cache to determine the existence of a specific error condition.

The method and apparatus of the present invention can be used to detect numerous types of error conditions. For example, it is possible to detect errors relating to control commands, such as a "flush" command. Other types of errors that can be detected include write errors, read errors, I/O errors, and various other hardware and software errors. Some of these transactions would not normally run on the bus 130. However, using the method and apparatus of the present invention, these errors become visible on the bus 130 so the error can be detected by the system control and debug module 152 and stored in the trace cache 153.

It will be understood by those of skill in the art that there is more than one type of transaction error that can be handled by the system of the present invention. One type of transaction error relates to a flawed transaction that may be "broken" or unsupported. Another type of transaction error that is supported by the present invention relates to the HT agents themselves, that may not be configured correctly, such as an AMAP programming error.

While the system and method of the present invention has been described in connection with the preferred embodiment, it is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

What is claimed is:

1. A system for detecting transaction errors in which the system has a plurality of data processing devices that use a common system interconnect bus, comprising:
   a node controller operably coupled to the system interconnect bus;
   a plurality of interface agents operably coupled to the node controller to have transactions with a source external to the system; and
   an address table coupled to the node controller and having a plurality of predetermined virtual addresses that operate as dummy registers, wherein the virtual addresses correspond to predetermined transaction error conditions and wherein an error in a particular transaction through one of the interface agents is identified as having one of the predetermined transaction error conditions in the node controller, in which the error is associated with a corresponding address in the address table and particular transaction is routed to the corresponding address, so that the node controller is operable to flag the error by placement of the corresponding address on the system interconnect bus for detection by the data processing devices, in order to inhibit one or more data processing devices from generating additional error indications when processing the particular transaction with the error and the particular transaction is stored for subsequent debugging.

2. The system of claim 1, wherein the interface agents operate on data using a hypertransport protocol.

3. The system of claim 1, further comprising a system control and debug module operably coupled to the system interconnect bus to perform debug operations.

4. The system of claim 3, further comprising a trace cache operably coupled to the system control and debug module, wherein transaction with errors detected by the system control and debug module are stored in the trace cache.

5. The system of claim 4, wherein the trace cache stores only a predetermined set of errors corresponding to a specified diagnostic protocol.

6. The system of claim 1, wherein the transactions are input/output transactions.

7. The system of claim 1, wherein the transactions are control commands.

8. The system of claim 1, wherein the transactions are memory write commands.

9. The system of claim 1, wherein the transactions are memory read commands.

10. A method for detecting transaction errors in which a system has a plurality of data processing devices that use a common system interconnect bus, comprising:
    detecting an error corresponding to a transaction between an interface agent and at least one of the data processing devices in the system, in which the error is one of a plurality of predetermined error conditions for the system and the error is detected by a node controller coupled to the system interconnect bus;
    associating the detected error with a corresponding virtual address from a plurality of predetermined virtual addresses stored in an address table, wherein the predetermined virtual addresses operate as dummy registers;
    flagging the error on the system interconnect bus for detection by the data processing devices by placing the corresponding virtual address on the system interconnect bus to route the transaction to the corresponding virtual address, in order to inhibit one or more data processing devices from generating additional error indications when processing the transaction; and
    storing the transaction with the error for subsequent debugging.

11. The method of claim 10, wherein a switch couples the node controller to the interface agent.

12. The method of claim 11, wherein the interface agent operates on data using a hypertransport protocol.

13. The method of claim 10, wherein the transaction is an input/output transaction.

14. The method of claim 10, wherein the transaction is a control command transaction.

15. The method of claim 10, wherein the transaction is a memory write transaction.

16. The method of claim 10, wherein the transaction is a memory read transaction.

17. The method of claim 10, further including storing transactions with errors in a trace cache.

* * * * *